United States Patent
Narin

(10) Patent No.: US 7,213,079 B2
(45) Date of Patent: *May 1, 2007

(54) SUPPLEMENTAL REQUEST HEADER FOR APPLICATIONS OR DEVICES USING WEB BROWSERS

(75) Inventor: Attila Narin, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 64 days.

This patent is subject to a terminal disclaimer.

(21) Appl. No.: 11/169,939

(22) Filed: Jun. 30, 2005

(65) Prior Publication Data

US 2006/0031417 A1 Feb. 9, 2006

Related U.S. Application Data

(63) Continuation of application No. 09/754,065, filed on Jan. 5, 2001, now Pat. No. 6,966,034.

(60) Provisional application No. 60/215,341, filed on Jun. 30, 2000.

(51) Int. Cl.
G06F 15/16 (2006.01)
G06F 15/00 (2006.01)
G06F 17/00 (2006.01)
G06F 3/00 (2006.01)
G06F 9/00 (2006.01)

(52) U.S. Cl. .................. 709/246; 709/203; 709/206; 715/501.1; 715/513; 715/744

(58) Field of Classification Search .............. 709/203, 709/206, 216–219, 227, 246; 715/500, 501.1, 715/513, 733, 744, 764; 707/2, 10, 104.1; 704/260; 719/313, 315, 328
See application file for complete search history.

(56) References Cited

U.S. PATENT DOCUMENTS

| 5,948,061 | A |  | 9/1999 | Merriman et al. |
| 5,991,810 | A |  | 11/1999 | Shapiro et al. |
| 6,018,710 | A | * | 1/2000 | Wynblatt et al. ........... 704/260 |
| 6,085,224 | A |  | 7/2000 | Wagner |
| 6,167,441 | A |  | 12/2000 | Himmel |
| 6,212,536 | B1 |  | 4/2001 | Klassen et al. |
| 6,336,137 | B1 |  | 1/2002 | Lee et al. |
| 6,343,323 | B1 |  | 1/2002 | Kalpio et al. |
| 6,498,897 | B1 |  | 12/2002 | Nelson et al. |

(Continued)

OTHER PUBLICATIONS

Loukola, M.V., IPv6 Over ATM Flow-Handling, 1stIEEE International Conference on ATM, IACTM, IACTM '98, Feb. 1998, pp. 439-446, Helsinki, Finland.

Craig E. Wills, Mikhail Mikhailov, Towards a better understanding of Web resources and server responses for improved caching, article, Elsevier Science B.V., 1999, pp. 1231-1243, Worcester, MA.

J. H. Brewer, T. L. Duty, D. Cowperthwaite, A Java GUI for ΦSR, article, Elsevier Science B.V., 2000, pp. 715-717, Vancouver, BC, Canada.

(Continued)

Primary Examiner—Crystal J. Barnes
(74) Attorney, Agent, or Firm—Banner & Witcoff, Ltd.

(57) ABSTRACT

A method and system for generating and/or servicing requests for information requested across networks, such as the Internet, is disclosed. In some embodiments, supplemental request header information is included with HyperText Transfer Protocol (HTTP) requests for a web page. The supplemental request header information may identify one or more characteristics of an application for which the HTTP request was generated. In further embodiments, the Internet server servicing the HTTP request having such a supplemental request header may extract and use information from this header to select and/or modify the requested web page to best suit the requesting application's status and/or current characteristic.

20 Claims, 9 Drawing Sheets

U.S. PATENT DOCUMENTS

| | | | |
|---|---|---|---|
| 6,532,493 | B1 | 3/2003 | Aviana et al. |
| 6,564,243 | B1 | 5/2003 | Yedidia et al. |
| 6,584,497 | B1 | 6/2003 | Case et al. |
| 6,631,466 | B1 | 10/2003 | Chopra et al. |
| 6,643,684 | B1 | 11/2003 | Malkin et al. |
| 6,643,696 | B2 | 11/2003 | Davis et al. |
| 6,654,754 | B1 | 11/2003 | Knauft et al. |
| 6,684,257 | B1 | 1/2004 | Camut et al. |
| 6,775,687 | B1 | 8/2004 | Binding et al. |
| 2002/0026491 | A1* | 2/2002 | Mason et al. ............... 709/207 |
| 2004/0193695 | A1 | 9/2004 | Salo et al. |

OTHER PUBLICATIONS

Schubert Foo and Siu Cheung Hui, Delivery of video mail on the World Wide Web, article, Journal of Network and Computer Applications, 1997 20, pp. 389-403, Division of Software Systems, School of Applied Science, Nanyang Technological Unversity, Singapore.

T. Kiuchi, K. Ohe, S. Kaihara, Using a WWW-based Mail User Agent for Secure Electronic Mail Service for Health Care Users, article, Methods of Information in Medicine, pp. 247-253, © F. K. Schattauer Verlagsgesellschaft mbH (1998).

T. Kiuchi, S. Kaihara, C-HTTP-the development of a secure, closed HTTP-based network on the internet, conference paper, IEEE Computer Society Press, Los Alamitos, CA, pp. 64-75, 1996.

Hal Berghel, Life in a Packet-Sized World, Cybernautica, 1995, article, 2 pp., http://acm.org/-hlb/homepage.html.

Schubert Foo and Siu Cheung Hui, System Architectural Design for Delivering Video Mail over the World-Wide-Web, article, vol. 12 No. 4, Journal of Computer Science & Technology, Jul. 1997, pp. 372-385, Division of Software Systems, Nanyang Technologycal University, Singapore 639798.

Barron C. Housel, George Samaras and David B. Lindquist, WebExpress: A client/intercept based system for optimizing Web browsing in a wireless enviroment, article, Mobile Networks and Applications 3 (1998), pp. 419-431, Baltzer Science Publishers BV.

* cited by examiner

SUPPLEMENTAL REQUEST HEADER FOR APPLICATIONS OR DEVICES USING WEB BROWSERS

CROSS REFERENCE TO RELATED APPLICATIONS

This application is a continuation of pending U.S. application Ser. No. 09/754,065, entitled "Supplemental Request Header For Applications or Devices Using Web Browsers," filed Jan. 5, 2001, now U.S. Pat. No. 6,966,034 which claims priority to provisional application Ser. No. 60/215,341, entitled "Method And System For Using Headers Specific To an Application Or Device," filed Jun. 30, 2000, which is hereby incorporated by reference.

FIELD OF THE INVENTION

The inventions and embodiments disclosed herein relate generally to computer systems involving a computer network, such as the Internet. In particular, one or more embodiments are disclosed which relate to servicing requests for data transmitted across such a network, such as requests for web pages from a server computing device, such as an Internet server.

BACKGROUND OF THE INVENTION

The Internet (or World Wide Web) has assumed a position of critical importance in today's so-called Information Age. Everyday users, many of whom freely consider themselves to be "computer illiterate", are nevertheless able to access the wealth of resources on the Internet from their computers. This is made possible, in part, by the creation of web browsers (or internet browsers), which are software programs that allow different users and/or applications to access information on the Internet.

This ease of access is also due, in large part, to the nature in which much of this Internet information is presented to users. Using a HyperText Markup Language (HTML), Internet server developers can create graphical screens or pages to present their information to the user in an easily-understandable visual format. This information, commonly referred to as a "web page", is displayed on the user's screen, and can be navigated by the user with a simple input device, such as a mouse. Interactive controls, such as links to other web pages, may also be included with these web pages. These web pages are typically provided by the Internet server upon receipt of a request formulated by the user's Internet browser, or web browser, in accordance with a HyperText Transfer Protocol, or HTTP.

An alternative way in which these requests are initiated, and one that is becoming increasingly common, involves application programs that work in conjunction with a user's web browser to retrieve information from the Internet. For example, a book reading computer program (e.g., "MICROSOFT READER®," offered by Microsoft Corp.) might retrieve and display pages from one or more books provided by one or more selected online bookstores; or an accounting program (e.g., "MICROSOFT MONEY®", also offered my Microsoft Corp.) might automatically retrieve and display a stock market web page for a user. To accomplish this, the requesting program could transmit a request to the user's web browser, and the web browser might then formulate and send an HTTP request to the Internet server for the web page. The browser might also receive the information returned from the Internet server, and forward this information on to the requesting application program.

Alternatively, the requesting program might incorporate some (or all) of the web browser functionality within itself, using this internal web browser functionality to generate the HTTP request and communicate with the Internet server.

Upon receipt of a request for a particular web page, an Internet server usually just provides the requested web page in response. In some instances, an Internet server may respond with data that is configured for the particular web browser that generated the HTTP request. This is possible using an HTTP User-agent header that may be included with the HTTP request. The User-agent header identifies the particular web browser that formed the HTTP request for the web page. In other instances, the HTTP request might also include "cookies" that have been set by the server, which may contain information that identifies the particular user (e.g., the user's address or biographical information), depending on the particular web page being requested. "Cookies" are known to those skilled in the art, and will not be further described herein.

Despite the User-agent headers and cookies discussed above, there remain situations in which Internet servers provide web pages that are less-than-optimal for the display area used to display the web pages. For example, and as shown in FIG. 1, a full-screen web page may be sent to a user who is directly using a web browser (e.g., "MICROSOFT INTERNET EXPLORER®," offered by Microsoft Corp.) to access the web page. This full-screen page is acceptable, so long as the user and/or web browser use a full-screen display area 101 for the web page. However, many situations exist in which display area 101 may be resized by the user, an application program, and/or the web browser. Display area 101 may also be constrained by physical screen dimensions of a portable device used to operate the application program and/or web browser. For example, users of the "MICROSOFT WINDOWS®" operating system, offered by Microsoft Corp., are permitted the option of resizing a graphical display area 101. FIG. 2 shows the same screen from FIG. 1, with a resized display area 201. Because the Internet server was unaware of the resizing, the same full-screen web page was sent in response to the request. As a result, the resized graphical display area 201 displays a mere portion of the web page, and the user is typically required to scroll the display area 201 to the left, right, up and down to truly view its full contents.

FIG. 3 shows another example, in which a hand-held computing device 300 (such as the "POCKET PC®" products offered by the Hewlett-Packard Company, Casio Inc., or Compaq Computer Corp.) may be used to access web pages. The display area 301 on the hand-held computing device also differs from the full-screen display shown in FIG. 1, and like the resized display in FIG. 2, the full-screen web page provided by the Internet server is not ideal for use on display area 301.

The situations discussed above are mere examples of a problem encountered in the prior art in which an Internet server receives a request for information, such as a web page, and must prepare a response without sufficient information regarding the ultimate use of the web page. The Internet server provides the same web page, with the same layout and configuration, in response to web page requests received under different conditions and from different applications and/or devices, resulting in less-than-optimal usage of the user's, application's, and/or web browser's available display area. There is a present need for an improved Internet transmission protocol and system that can enable a more dynamic and customized Internet session to maximize the use of resources available to the requesting application and/or device which makes use of a web browser.

SUMMARY OF THE INVENTION

A supplemental request header is disclosed for use with network requests for information, such as web pages via the Internet, offered by server computing devices, such as Internet sites/servers. In this additional header, supplemental request information is provided to identify the current status and/or configuration of the web browser and/or the application or device that is ultimately using the requested information. At the server computing device, additional processing may occur to accommodate the criteria provided in the header and provide the requested information in a format best suited for the application for which the web page is requested.

In some embodiments, a user's computer system may monitor status information for the computer and/or applications operating on the computer, and may include some or all of this status information in requests for information to be retrieved from a server, such as an Internet server. The status information may: identify an application for which the information is requested; identify, specify, and/or describe a graphical display area to be used by the application for graphical Internet information such as web pages; indicate configuration settings of the application; and/or indicate the software and/or hardware capabilities available to the application.

In further embodiments, a portion (or all) of a web browser's functionality may be incorporated within an application operating on a user's computer, allowing the application to formulate requests, such as HTTP requests, for Internet data.

In further embodiments, a server is configured to locate a supplemental request header in a received request, and may use information in this header to determine the most appropriate response to the request, which may include the selection and/or creation of a version of the requested web page that is more suitable to the requesting user's, application's, device's or web browser's available resources and configuration.

DETAILED DESCRIPTION OF THE PREFERRED EMBODIMENTS

Figure 1:
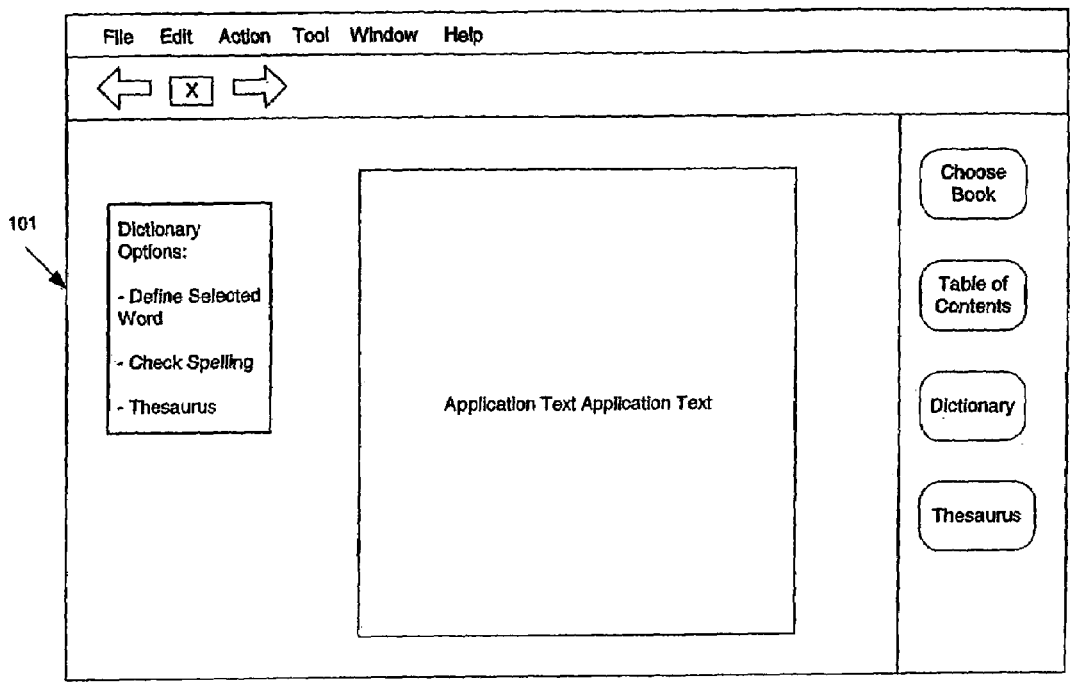
FIG. 1 is a screen image of an exemplary display screen of a prior art web browser accessing a web page.
Figure 2:
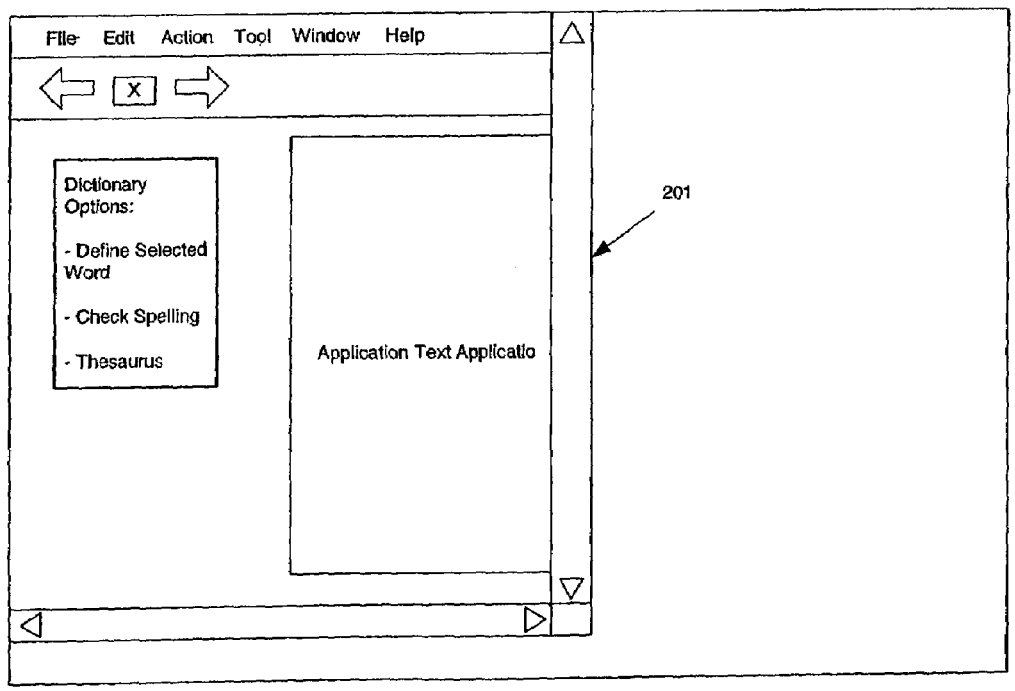
FIG. 2 is a screen image of an exemplary display screen of a prior art web browser accessing the web page shown in FIG. 1, with the web browser having a resized display area.
Figure 3:
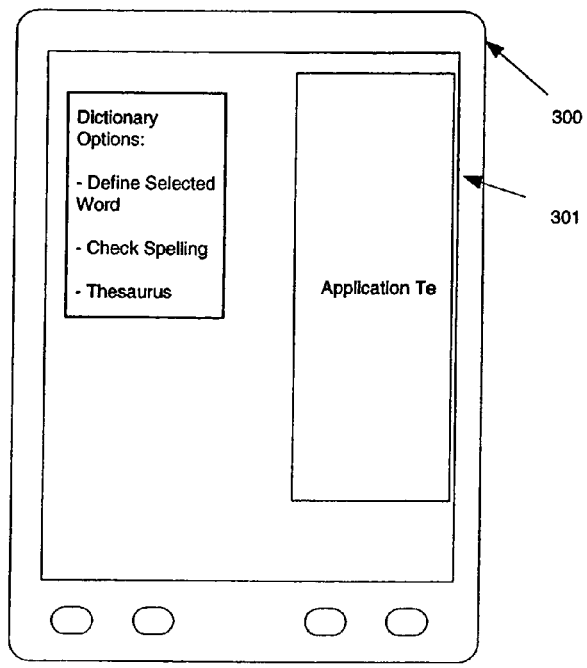
FIG. 3 is a diagram of a handheld computer with display area.
Figure 4:
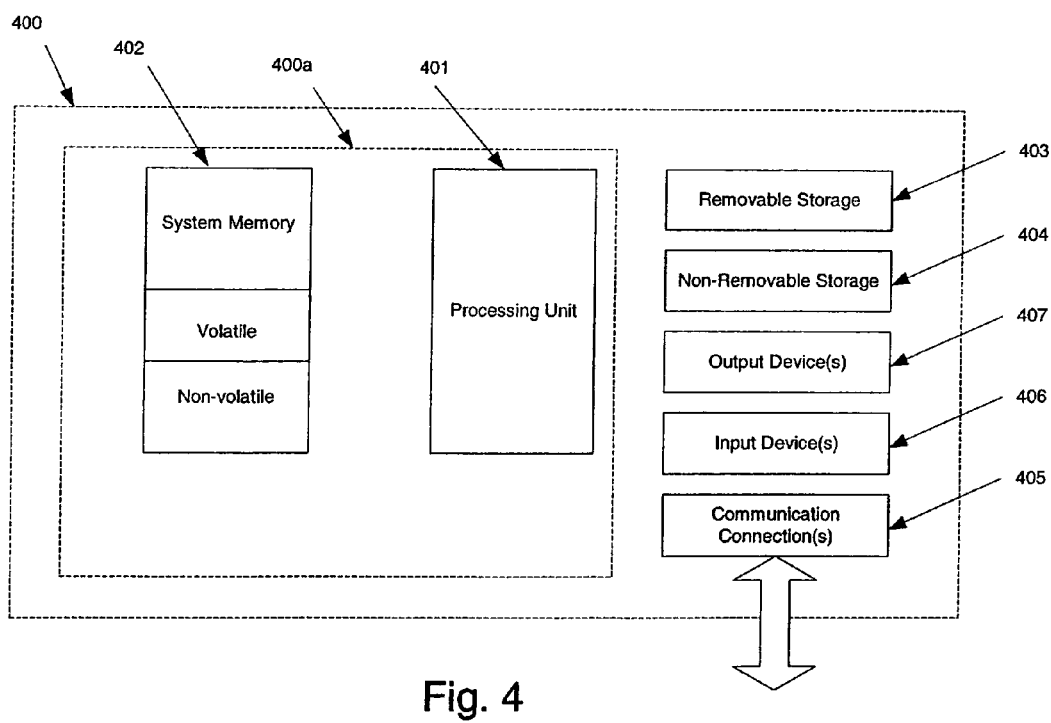
FIG. 4 is a system block diagram of an exemplary operating system in which one or more embodiments of the present invention may be implemented.

FIG. 4 is a block diagram of a simplified exemplary operating environment 400 in which one or more embodiments of the present invention may be implemented. Although the operating environment 400 is described herein as being suitable, this environment is merely one example of a suitable operating system, and the present description is not intended to suggest any limitation as to the scope of use or functionality of any embodiment of the present invention. Other well-known computing systems, environments, and/or configurations that may be suitable for use with one or more embodiments of the present invention include, but are not limited to, personal computers (PC), server computers, hand-held devices, laptop devices, multiprocessor systems, microprocessor-based systems, programmable consumer electronics, network PCs, minicomputers, mainframe computers, distributed computing environments that include any of the above systems, devices, or the like. Furthermore, the device 400 may be implemented in a desktop configuration, a portable computer configuration, or a hand-held computer, such as the "POCKET PC®" hand-held products discussed above.

One or more embodiments of the invention may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

With reference to FIG. 4, an exemplary system for implementing the invention includes a computing device, such as computing device 400. In its most basic configuration, computing device 400 typically includes at least one processing unit 401 and memory 402. Depending on the exact configuration and type of computing device, memory 402 may be volatile (such as RAM), non-volatile (such as ROM, flash memory, etc.) or some combination of the two. This most basic configuration is illustrated in FIG. 4 by dashed line 400a. Additionally, device 400 may also have additional features and/or functionality. For example, device 400 may also include additional storage (removable and/or non-removable) including, but not limited to, magnetic or optical disks or tape. Such additional storage is illustrated in FIG. 4 by removable storage 403 and non-removable storage 404. Computer storage media includes volatile and nonvolatile, removable and non-removable media implemented in any method or technology for storage of information such as computer readable instructions, data structures, program modules or other data. Memory 402, removable storage 403 and non-removable storage 404 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Device 400 may also contain communications connection(s) 405 that allow the device to communicate with other devices and/or networks. Communications connection(s) 405 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media, and combinations of any of the above should also be included within the scope of computer readable media.

Device 400 may also have one or more input device(s) 406 such as a keyboard, mouse, pen, voice input device, touch input device, etc. One or more output device(s) 407 such as a display, speakers, printer, etc. may also be included. All these devices are well known in the art and need not be discussed at length here.

Figure 5:
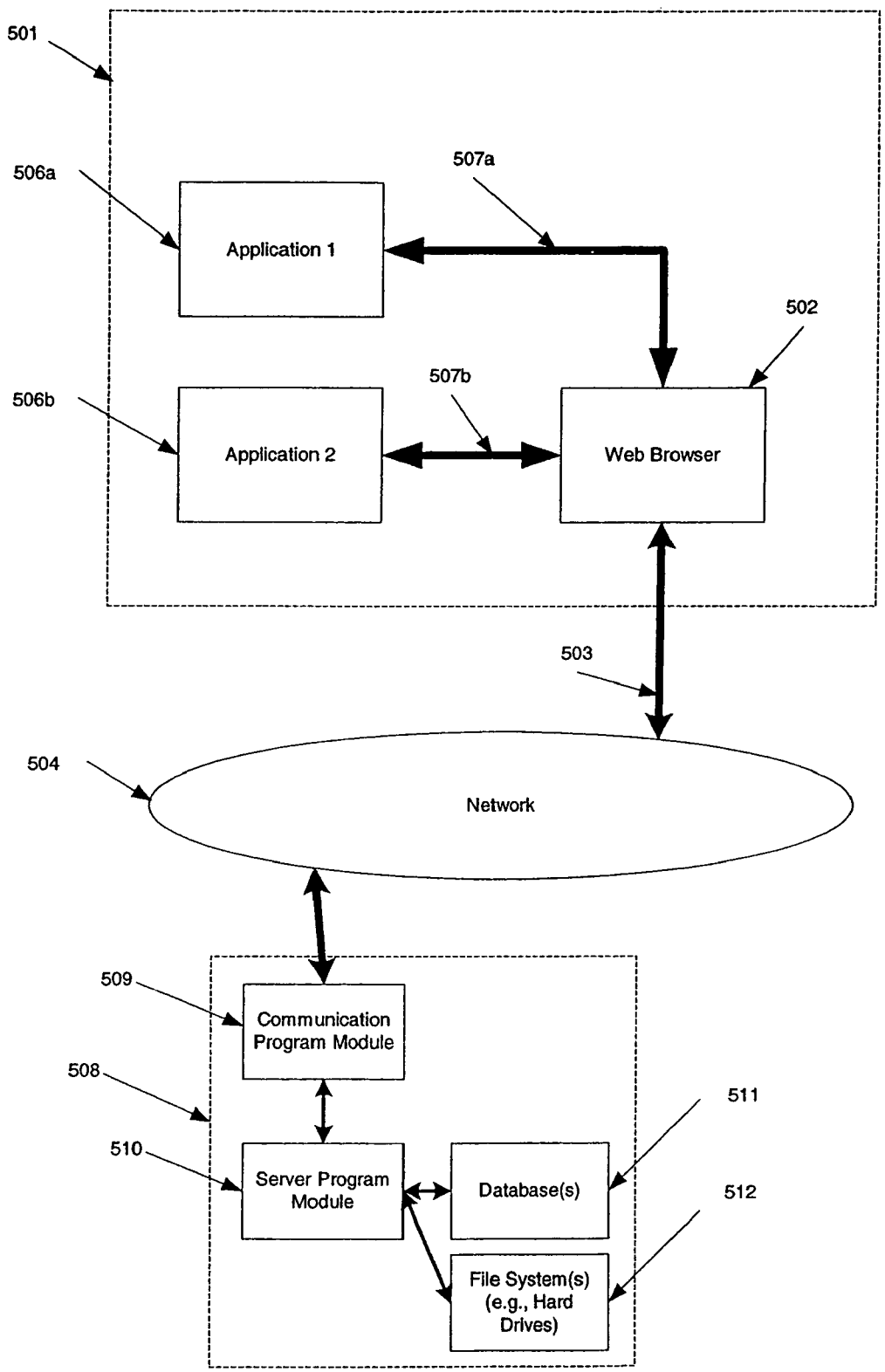
FIG. 5 is a system diagram of an exemplary configuration of one embodiment of the present invention.

With reference to FIG. 5, various software components of one embodiment of the present invention are shown. In FIG. 5, the user's device 501 may be implemented using various types of computing device environments, including the environment as shown in FIG. 4. The user's device 501 may include a web browser program module 502 which may be a known web browser (e.g., "MICROSOFT INTERNET EXPLORER®") that is modified to embody the present invention, or any other program module that enables the device 501 to communicate with network 504.

Communication link 503 enables the web browser 502 to communicate with one or more networks 504. Network 504 may be any form of communication network, including networks that use the HTTP protocol, such as the Internet or World Wide Web, as well as other types of networks such as an Intranet, Extranet, etc. Link 503 also enables the web browser 502 to communicate with one or more devices and/or systems that may also be communicatively connected to the network, such as server computing device 505. In one embodiment, communication link 503 uses the communication connection 405 of a computing environment 400 in which the present invention may be implemented.

The user's device 501 may also include one or more application programs 506*a–b* besides the web browser 502. These applications may be any type of software program a user might have, such as "MICROSOFT MONEY®", "MICROSOFT WORD®", "MICROSOFT READER®", all offered by Microsoft Corp., and the like. These applications 506*a–b* may communicate with web browser 502 using internal communication links 507*a–b*, which may be implemented in any of a number of well-known methods and systems for enabling applications, processes, and/or program modules to communicate with one another.

Server computing device 508 may also be implemented using the computing environment shown in FIG. 4. The server computing device 508 may include a communication program module 509 that enables communication with the network 504. The communication program module 509, and all program modules disclosed herein, may be implemented as one distinct module, or as separate modules performing one or more of the process steps described herein. The communication program module 509 may further communicate with server module 510, which receives requests for information, such as web pages, and determines the appropriate response. Server module 510 may communicate with one or more databases 511 or file systems (e.g., hard drives) 512. Database 511 and/or file system 512 may store one or more web pages which are offered by the server 508, and may be located in one or more memories located within server computing device 508, or alternatively, may be located external to server computing device 508. Web pages may be stored in any number of formats, such as HTML files, ASP files, etc. A discussion of the operation of the server computing device 508 appears below with respect to FIGS. 6 and 7.

Figure 6:
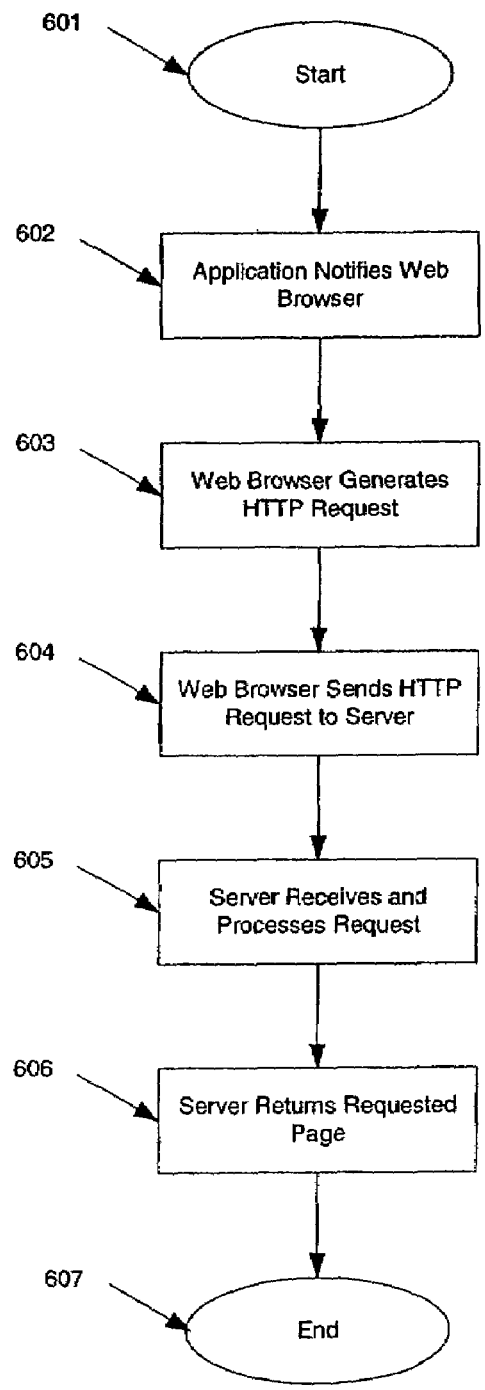
FIG. 6 is a flow diagram showing process steps for requesting and receiving information according to one embodiment of the present invention.

FIG. 6 shows a flow diagram of an HTTP request for information, such as a web page, from a server computing device 508 according to one embodiment of the present invention. The process begins at step 601, when an application 506*a* determines that a web page is needed from server computing device 508. Application 506*a* may first transmit a request, in step 602, to the user's web browser 502. Then, in step, 603, the web browser 502 interprets the application's request and generates the appropriate HTTP request for the web page from the server computing device 508.

The HTTP request generated by the web browser 502 in step 603 may follow the predefined HTTP format, which generally includes the following sections:
  Initial Request Line
  Header1 :Value1 (optional, and may have more than one)
  <blank line>
  Message Body The HTTP format supports a number of predefined headers, one of which is the "User Agent" header. The User Agent header includes information identifying the particular web browser 502 that is making the HTTP request. An exemplary User Agent header is as follows:
  "User-agent: MSIE"

This header, if present in an HTTP request, indicates that the web browser 502 generating the request was "MICROSOFT INTERNET EXPLORER®". In one or more embodiments of the present invention, the HTTP request includes an additional supplemental request header. This added header may provide additional information to the server computing device 508 servicing the request. In one embodiment, the header might include an identification of the particular application 506*a* that will ultimately use the requested web page (or other information) from the server computing device 508. For example, the supplemental request header might read as follows:
  "MS-Reader: V1.0.0.xxxx"

In this exemplary embodiment, the supplemental request header indicates to the server computing device 508 that the application 506*a* is the "MICROSOFT READER®" application. The header may also indicate the version of the "MICROSOFT READER®" product, such as version 1.0.0.xxxx. Such version information can be used by the server to render the matching version of the web page that's being requested, or if the version of the requesting application is no longer supported, the server can prompt the user to upgrade the application.

In alternative embodiments, the supplemental request header may provide other types of information. For example, the supplemental request header might include an identification of the size or dimensions of a graphical display area being used to display the requested web page. The size or dimensions may be dictated by the application, the user's hardware environment, or both, and may be indicated, in one embodiment, as a pixel size indicating height, width, or both. Alternatively, the supplemental request header may indicate the size or dimensions in linear measurement terms, such as inches, feet, yards, millimeters, centimeters, etc. As yet another alternative embodiment, the supplemental header may provide the size and/or dimensions using predefined formats, such as "portrait", "landscape", "full-screen", "top-half screen", "bottom-half" screen, etc. that define characteristics of a portion of the screen that may be used to display the requested web page or information. The supplemental request header may also (or alternatively) include other characteristic information identifying the current settings of the user's hardware, such as the resolution, sharpness, color tint, contrast, and/or brightness of a display monitor, or the volume and/or frequency amplification of one or more speakers. The supplemental header may include information regarding hardware characteristics of the user's device, such as its color. For example, a user might be using a computer whose hardware is red in color, and the requested web page might be configured to match or complement the color of the user's computer. The supplemental header may include information regarding one or more characteristics of a network condition, such as traffic amount, available bandwidth, latency, etc.

This information may be useful to the server computing device 508, for example, in determining which web page to send in response to the request. This determination, and the server response to the received supplemental request header, is further discussed below.

Other types of characteristic information that may be included in the supplemental request header include all types of status, configuration, and/or preference information relevant to the application 506a, the user's device, or even the user. For example, the supplemental request header might include an indication of the font, font color, and/or font size currently being used by the application 506a. The supplemental request header may include user interface information concerning an application 506a, such as a user interface theme, color scheme, style, etc., that might, in some embodiments, allow the server to provide a web page that matches and/or blends in well with other applications of the user. A theme may be as simple as a color scheme, but may also include other characteristics such as a text font, graphic style, audio option, etc. For example, one user interface theme might use graphical buttons of a particular shape or style. The supplemental request header may identify whether the user has activated or deactivated certain application 506a features, or configuration information of the application 506a. It may further indicate the language setting of the application (e.g., English, Japanese, French, etc.) and/or other locale or region specific settings that the user may have selected.

As another example, the supplemental request header may identify the hardware of computer device 501 that is available for use by the requested web page. If, for example, the computer device 501 includes audio speakers, but the speakers are already being used by another application (506b, for example), or the user has indicated that no audio portion of the requested web page is needed, then the server computing device 508 need not transmit the audio portion of the requested web page to the web browser 502 and/or application 506a. The supplemental request header can also simply indicate whether such speakers (or other hardware device) are physically present.

The actual format of the supplemental request header can vary according to the particular types of information desired. An exemplary supplemental request header may appear as follows:

"MS-Reader: V2.0.0.0.xxxx F30 G0 W510 H650"

This exemplary supplemental request header may be interpreted at the server computing device 508 to mean that the application 506a requesting the web page is "MICROSOFT READER®", version 2.0.0.xxxx, where the font is font number 30 (e.g., Times New Roman), the "visual guides" feature is turned off, the width of the display area is 510 pixels, and the height of the display area is 650 pixels. However, and as stated above, it will be understood that any desired format may be implemented for the supplemental request header. The supplemental request header may be implemented as an optional header, and may also have optional fields for the various types of information, allowing the supplemental request header to vary in format as needed.

As stated above, the web browser 502 may generate the request, including the supplemental request header, in step 603 of the FIG. 6 process. There are a number of ways in which the web browser 502 can obtain the information needed to generate the supplemental request header. For example, the web browser 502 may simply receive the application's characteristic information (e.g., the display area dimensions, font, etc.) from the requesting application 506a itself. Alternatively, the web browser 502 (or some other process in device 501) may monitor the status of the device 501, and may store this status information in a memory, such as memory 402, that is accessible to web browser 502. For example, if a user turns the volume completely down to zero on speakers (not shown) connected to device 501, this status might be stored in a table or file in memory 402. Then, as the web browser 502 constructs the request, the web browser might include a supplemental request header that indicates to the server computing device 508 that the speaker volume is minimized, and the server computing device 508 may respond by omitting (or adjusting the volume of) an audio portion of the requested web page.

The web browser sends the HTTP request in step 604 to the server computing device 508 through the network 504 using the appropriate transmission protocols, such as Internet transmission protocols, which are well-known in the art. In step 605, upon receiving the request, the server 508 processes the request to determine the appropriate response. For example, the server 508 may need to determine whether a requested data file actually exists at the server 508. In step 606, the server 508 then formulates and transmits an HTTP response that either contains the requested information or web page, or provides an error message indicating that there was a problem in responding to the request, and the process then ends in step 607. The steps taken by the server 508 are discussed in greater detail below with respect to the embodiment whose flow diagram is shown in FIG. 7.

Figure 7:
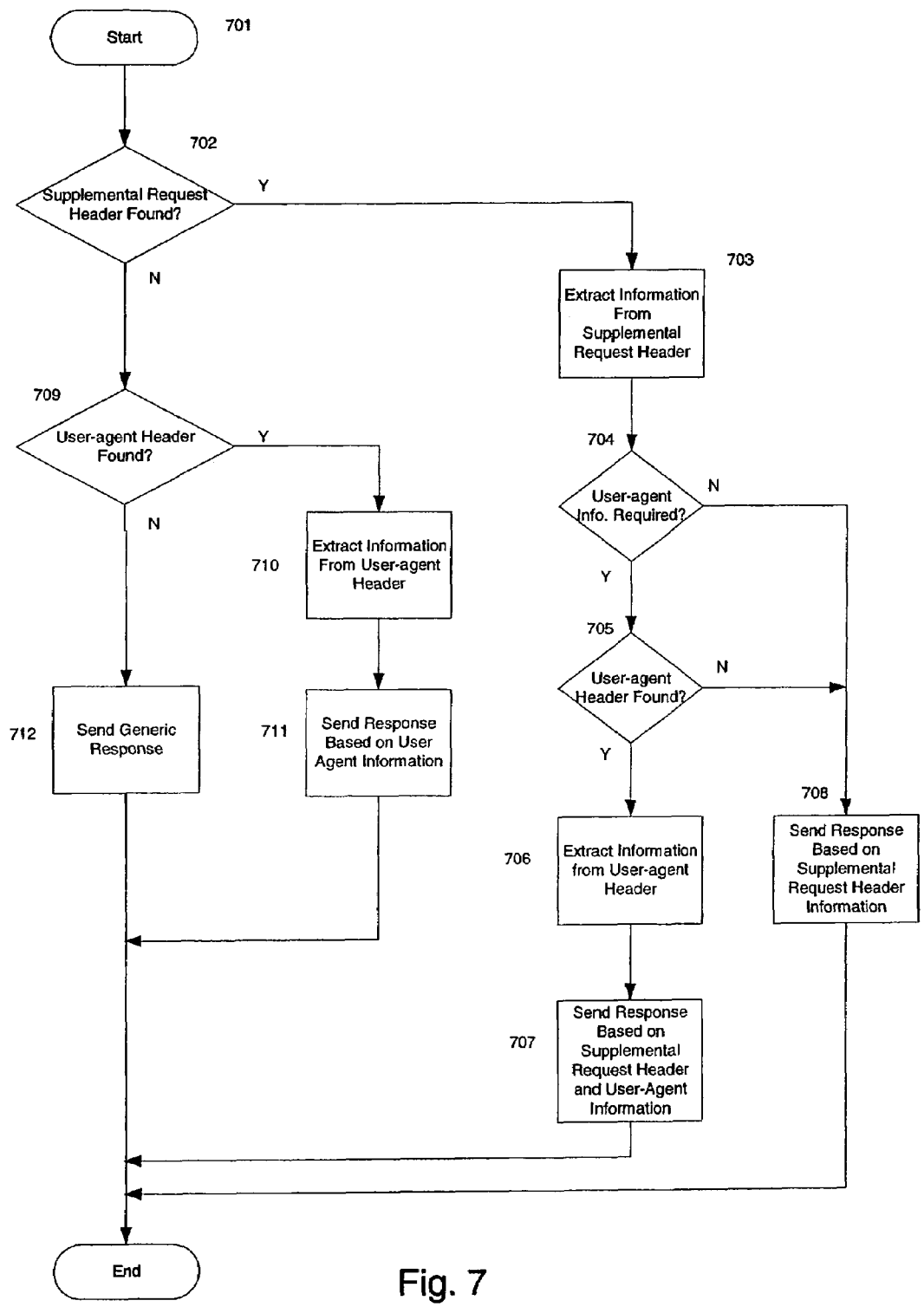
FIG. 7 is another flow diagram showing process steps for handling an HTTP request according to one embodiment of the present invention.

FIG. 7 is a flow diagram depicting the steps taken in an exemplary embodiment in which the server 508 receives and responds to an HTTP request. The process starts at step 701 when the communication program module 509 receives an incoming request. The communication program module 509 may reformat the incoming request according to the network's 504 transmission protocol, and may then forward the request to server module 510 for substantive handling and response.

In step 702, the server program module 510 (or, alternatively, communication program module 509) determines whether a supplemental request header exists in the HTTP requests. If such a header is found, then the process moves to step 703, in which the information contained in the supplemental request header is extracted. This extraction may be performed by communication program module 509, server module 510, or both.

After extracting the supplemental request header information, the process moves to step 704, in which the server program module 510 determines whether the information normally found in the User-agent header (e.g., identifying the web browser 502) is necessary. In some instances, the supplemental request header information alone will provide all the information needed by the server program module 510 to form a proper response. If this User-agent information is needed, then the process moves to step 705 to determine whether the User-agent header is present in the HTTP request. If the User-agent header is found in the HTTP request, then the User Agent information is extracted from this header in step 706, and the server program module 510 formulates a response based on both the supplemental request header information and the User Agent information. In formulating this response, the server program module 510 may consult database 511 or file system 512 to select one of a number of pre-stored web pages. The selected page may be the one best-suited to the supplemental request header information in view of the supplemental header information. For example, the server program module 510 might select a smaller version of the web page, with fewer user interface elements (e.g. buttons, menus, etc), if the supplemental request header information indicates that a reduced-size display is available for displaying the web page. A reduced-size display area may be variously defined, such as having a width less than 400 pixels, or a height less than 500 pixels, etc. Alternatively, the server program module 510 may retrieve a version of the web page from database 511 or file system (e.g., hard drive) 512, and then modify it prior to sending the page in response to the request. The server module 510 provides the communication module 509 with the appropriate response, and communication program module 509 formats and/or sends this response in step 707, concluding the process.

If, in step 705, the User-agent header was not found, then the process proceeds to step 708, in which the server program module 510 prepares and sends a response based on the supplemental request header information only. Once the response is sent, the process could then conclude.

If, in step 702, the supplemental request header was not found in the HTTP request, then the process proceeds to step 709 to determine whether a User-agent header was found in the request. If so, then the User Agent information is extracted in step 710, and the server program module 510 transmits the response using the User Agent information in step 711. The process may then conclude.

If, however, in step 709 it was determined that the User-agent header was not present, then the server program module 510 may render a generic response in step 712. A generic response may be simply the entire web page, as requested by the web browser. The process would then conclude.

The process shown in FIG. 7 and described above represents one embodiment of the present invention. However, it will become apparent to anyone of ordinary skill in the art that the process disclosed herein may be modified without departing from the scope and spirit of the present invention. For example, one or more steps may be omitted or duplicated (e.g., step 704 might be omitted, or duplicated prior to checking for the User-agent header in step 709). Alternatively, the process steps may be altered, divided, combined and/or rearranged. For example, the process might check for the User-agent header prior to checking for the supplemental request header. Furthermore, process steps described to be performed by particular modules may alternatively be performed by other program modules, and may be combined and/or rearranged as is well-known in the computer programming art.

In steps 707 and 708, described above, the server program module 510 generates a response using the information supplied within the supplemental request header. As discussed above, the supplemental request header may include any number of preference, configuration, setting, state, or other information regarding the application 506a for which the HTTP request was generated. Upon receiving this information, the server program module 510 may be configured to select and/or generate the most appropriate response to the request, in view of the supplemental request header information. For example, the server program module 510 might use the supplemental request header information to cause a different web page to be sent to different applications 506a based on the relative size or dimensions of the application's display area. If a display area is smaller than a predefined size, such as a height less than 600 pixels and/or a width less than 250 pixels, a reconfigured web page, or a smaller web page, might be sent in response. Numerous alternatives will be apparent, such as selecting particular web page based on the resolution, font, color, brightness, other characteristic, etc. of a display area.

Figure 8A:
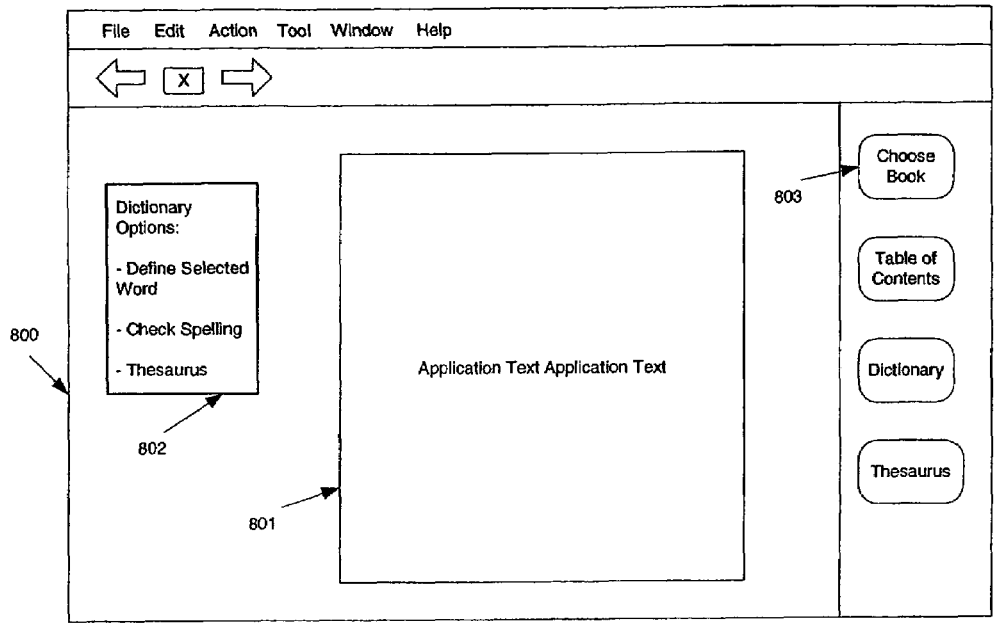
FIGS. 8a–d are exemplary screen shots and diagrams depicting web pages received according to an exemplary embodiment of the present invention.
Figure 8B:
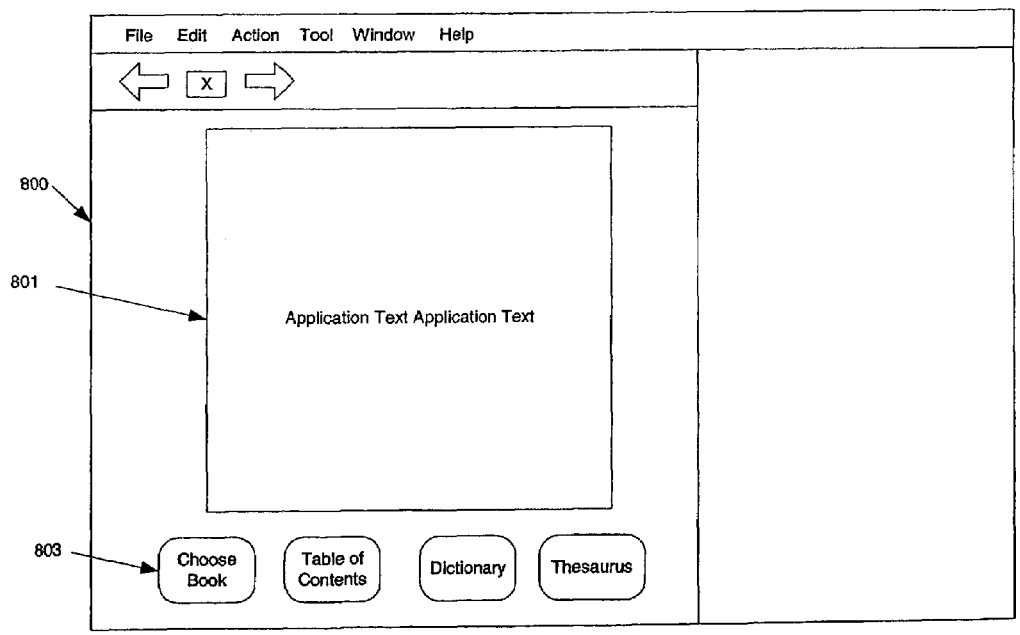

FIGS. 8a–d depict various screens resulting from one or more aspects of the present invention. In FIG. 8a, a full-screen display area 800 may be used to display a web page for the "MICROSOFT READER®" product offered by Microsoft Corp. In the FIG. 8a embodiment, the "MICROSOFT READER®" web page may include a content area 801 having, for example, graphical images of text pages from a book. To the left of content area 801 may be a menu area 802, in which various menus and/or features may be displayed (e.g., a help dialog box), and to the right of content area 801, a user command interface area 803 may be provided to offer graphical buttons for the user to select.

If the requesting user, device, application and/or web browser has a resized display area, this size information may be included in a supplemental request header according to one or more aspects of the present invention, and the server may respond with a slightly different web page. In the FIG. 8b example, the web page may retain content area 801, but may relocate the interface area 803, and may omit the menu area 802. These modifications are merely exemplary, and may be determined according to the particular information provided in the supplemental request header, such as size or dimension information regarding the available display area 800.

Figure 8C:
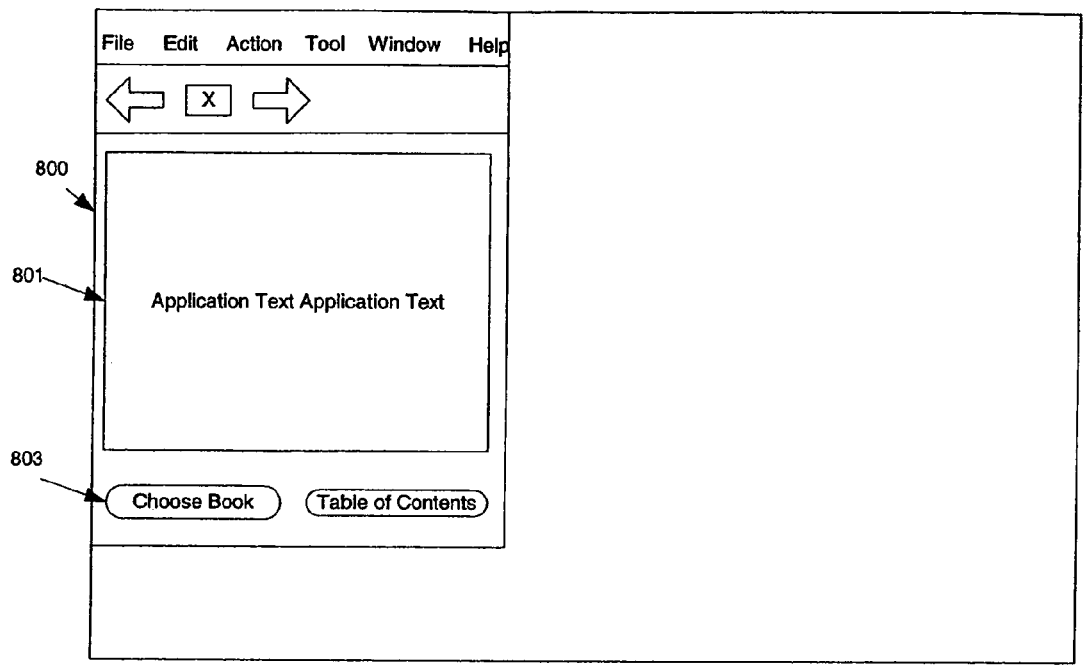

FIG. 8c depicts an example in which an even smaller display area 801 is used. For this display area, the server might supply a web page that retains a reduced version of content area 801, and may omit the menu area 802 as well as some of the graphical buttons from interface area 803. The buttons may also be resized.

Figure 8D:
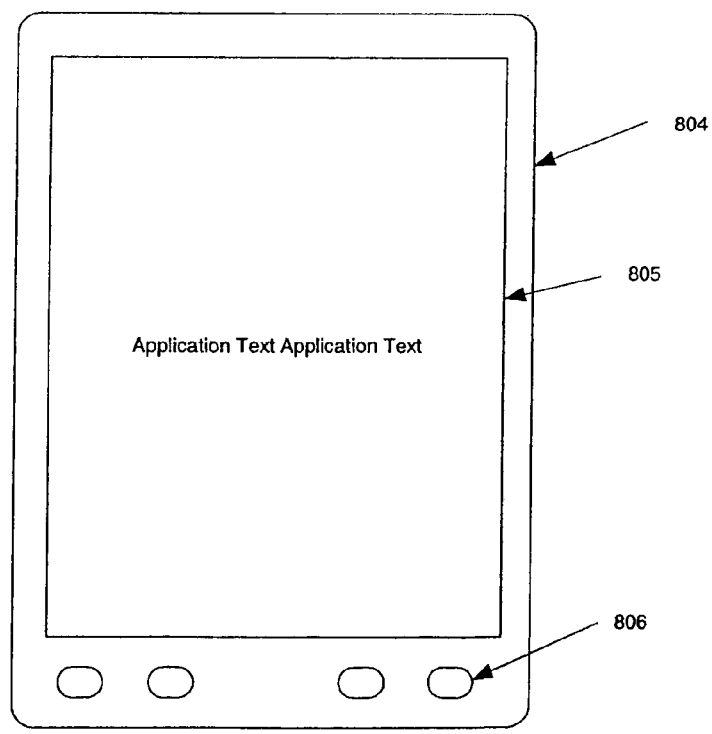

FIG. 8d depicts an example in which the "MICROSOFT READER®" program is implemented on a hand-held computing device, such as the "POCKET PC®" devices noted above. The FIG. 8d device 804 may have an even smaller display area 805. The server may recognize that the device 804 already includes one or more buttons 806, and may simply provide a reduced content portion 801, without menu area 802 or interface area 803. The server 508 may further be configured to provide a reduced content portion 801, without menu area 802 or interface 803, in view of the smaller display area 805, even if buttons 806 were absent.

Other examples include the transmitting of a web page that excludes an audio portion of the web page when the supplemental request header information indicates that the user's device 501 does not have audio speakers, or that the user has temporarily deactivated the audio speakers, or turned the speaker volume to the minimum. Alternatively, a server program module 510 might use a web page with larger (or smaller) sized typeface/font depending on the resolution setting of the user's device 501. To illustrate, a user whose device 501 is currently configured for a higher resolution may warrant a higher-resolution web page, while a device 501 having a lower resolution may be satisfied with a lower resolution web page. The user might subsequently change the resolution setting, and upon returning to the web page, a page having a different resolution may be displayed.

The server program module 510 may, on some embodiments of the present invention, dynamically vary the web page sent to the application 506a based on the user changing characteristics of the user's system 501 and/or application 506a settings. For example, if the user requests the web page with the application 506a configured as shown in FIG. 8c, and subsequently resizes the display area to more closely resemble that of FIG. 8b, the web browser 502 may be configured to automatically retransmit the HTTP request to the server 508, but with updated supplemental request header information to indicate the new display area available. In response, the server program module 510 may then send a different web page, such as the one shown in FIG. 8b. This may be accomplished simply by having the web browser 502 (or some other program module, process, or the application 506a or 506b) monitor the device 501 for changes to predefined criteria (such as the display area, resolution, state of hardware devices, software settings, etc.), and transmit new HTTP requests when a change is detected. Alternatively, the web browser 502 may simply be configured to periodically transmit a new HTTP request to the server 508 to refresh a web page already being viewed.

To allow for this functionality, the server program module 510 might store one or more different versions of the same web page in database 511 or on file system (e.g., hard drive) 512 in anticipation of sending varying forms of the requested page. Alternatively, the server 508 might store a single form of the web page in the database, and the server program module may dynamically modify this web page prior to transmitting the web page to the application 506a. As another alternative, the server 508 might combine the two preceding options, storing a number of alternate pages, and also modifying a page prior to sending it to the requesting application 506a.

Another advantage that may be realized at the server 508 relates to gathering information concerning the applications 506a that are requesting information offered by the server 508. For example, a server program module 510 may track the frequency with which users of various applications access the server's web page. A stock market server 508 might gather market information regarding which of several accounting software programs is most effective in promoting the use of the server 508 through the accounting program (e.g., 506a), or which accounting program most readily leads customers to the server 508. This information can be used by the stock market server 508 to, for example, offer different incentives and/or discounts to the developers of these various types of accounting software. A server may learn information about the type of application programs accessing the server, and as a result, better tailor their services for their primary visitors. Additionally, this information may be used for advertising purposes. The present example uses reader software and accounting software as examples, and it will be readily understood by one of ordinary skill in the art that various types of market information may be gathered using one or more embodiments of the present invention.

Figure 9:
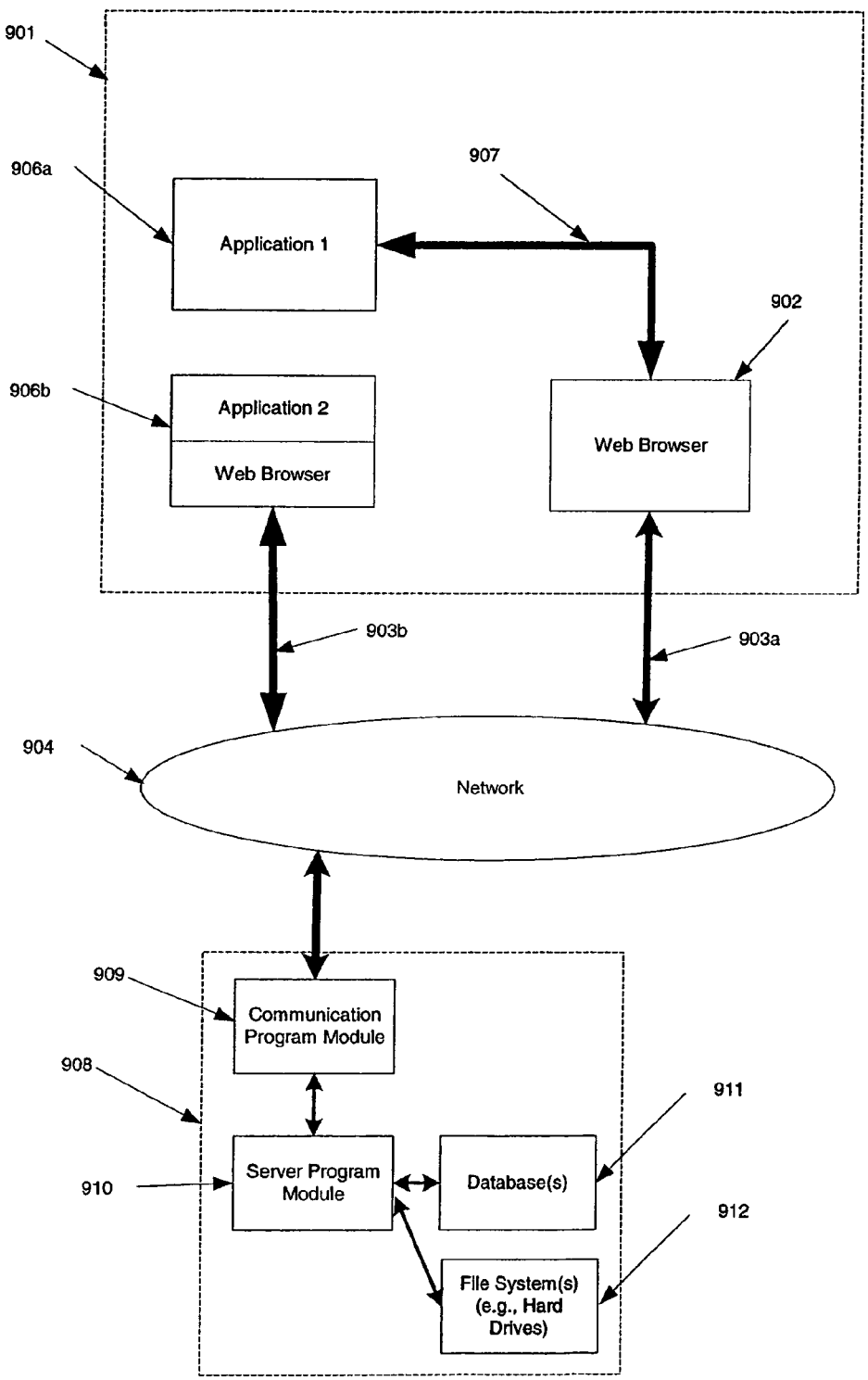
FIG. 9 is an alternate configuration of the system shown in FIG. 5.

FIG. 9 shows an alternative embodiment of the system shown in FIG. 5. In the FIG. 9 system, the user's device 901 may be implemented using the same configurations as device 501, and having applications 906a–b and web browser 902. However, one or more applications 906b may incorporate some or all of the web browser 902 functionality within the application 906b itself. For these applications, the HTTP request may be generated internally, without the need for the separate web browser 902, and may be transmitted to the server 908 using a communication link 903b, which may be implemented in a similar manner as link 503. Web browser 902 may operate with application 906a using link 903a as described above with regard to FIG. 5, or alternatively, may be modified, and may even be removed altogether. The server 908 may store various web pages in one or more databases 911 and/or file system storage (e.g., hard drive) 912. Such an alternate system may include some or all of the various features discussed above.

Figure 10:
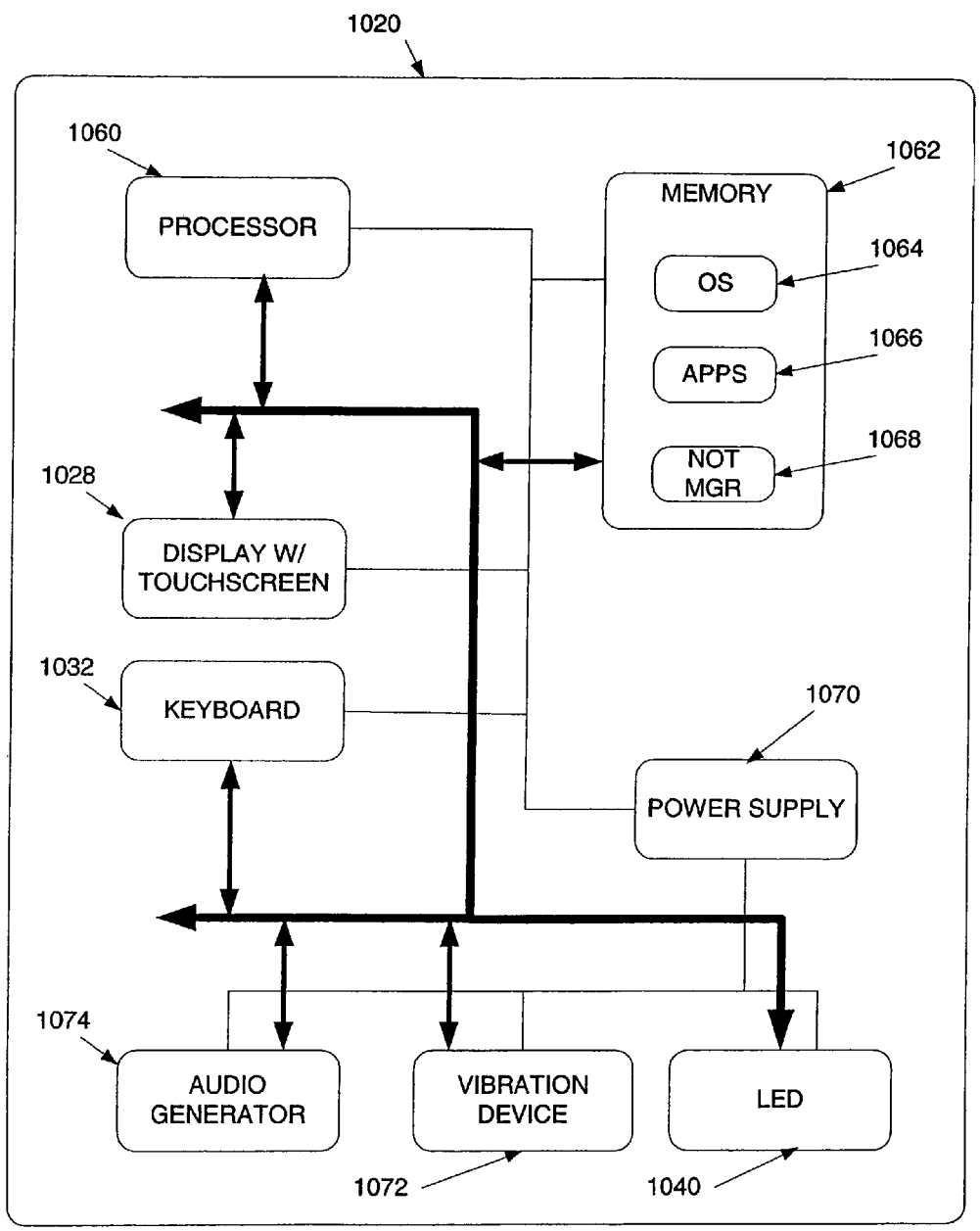
FIG. 10 is a functional diagram of an alternate embodiment of the present invention.

FIG. 10 depicts functional components of an alternate embodiment of the present invention, in which the user device 501 is implemented using a hand-held computing device, such as the one shown in FIG. 8d. In this alternate embodiment, the device 1020 may include a processor 1060, a memory 1062, display 1028, and a keyboard/buttons 1032. The memory 1062 generally includes both volatile memory (e.g., RAM) and non-volatile memory (e.g., ROM, PCMCIA cards, etc.). An operating system 1064 may be resident in memory 62, and may execute on processor 60. The device 1020 may include an operating system, such as the "WINDOWS CE®" operating system from Microsoft Corp., or another operating system.

One or more application programs 1066 may be loaded into memory 1062 and run on the operating system 1064. These application programs 1066 may include one or more program modules, and may include the various applications discussed herein, as well as a web or Internet browser. Other examples of application programs include email programs, scheduling programs, PIM (personal information management) programs, word processing programs, spreadsheet programs, etc. The device 1020 may also include a notification manager 1068 loaded in memory 1062, which executes on processor 1060. The notification manager 1068 handles notification requests from the applications 1066.

The device 1020 has a power supply 1070, which may be implemented as one or more batteries. The power supply 70 might further include an external power source that overrides or recharges the batteries, which may be built-in, such as an AC adapter or a powered docking cradle.

The device 1020 is also shown with three types of external notification mechanisms: an LED 1040, a vibration device 1072, and an audio generator 1074. These devices may be directly coupled to the power supply 1070 so that when activated, they remain on for a duration dictated by the notification mechanism even though the device processor and other components may shut down to conserve battery power. The LED 1040 preferably remains on indefinitely until the user takes action. The vibration device 1072 and/or audio generator 1074 may be configured to deactivate with the rest of the system, and/or upon expiration of a predefined time period following activation.

The foregoing discussion relates to embodiments of the present invention involving the Internet, and references transmissions according to HTTP (HyperText Transfer Protocol). However, it will be understood that aspects and/or embodiments of the present invention are not limited to that particular protocol, and they may be implemented with other communication protocols for communications within a networked environment that allow headers to be included as part of the request or associated with the request.

The discussion above provides exemplary aspects and embodiments of the present invention, but the invention is not limited to the particular configurations disclosed. Rather, the disclosed embodiments are merely exemplary embodiments. Those skilled in the relevant arts will readily appreciate the fact that many variations to the disclosed embodiments may be made without departing from the spirit and scope of the present invention. For example, one or more of the disclosed aspects or embodiments may be combined with one or more other aspects or embodiments.

I claim as my invention:

1. A method of obtaining data for an application from a server, comprising:
   (a) receiving, from the application, a request for data offered by the sever;
   (b) transmitting, in response to the application request, a request for the data to the server, wherein the request includes header information identifying (i) a display area for a device on which said application is running and (ii) whether said application is running in a full screen mode or a partial screen mode; and
   (c) receiving data from the server responsive to the request, wherein the received data is formatted in accordance with the display area and screen mode identified in the header information.

2. The method of claim 1, wherein said request is formulated pursuant to a HyperText Transfer Protocol (HTTP).

3. The method of claim 2, wherein said request further includes an HTTP User-agent header identifying a web browser to said server.

4. The method of claim 1, wherein said header information identifies a version of said application.

5. The method of claim 1, wherein said header information identifies a locale setting of said application.

6. The method of claim 1, wherein said header information further includes information identifying a resolution of said display area.

7. The method of claim 1, wherein said header information further includes information identifying a font used by said application.

8. The method of claim 1, wherein said transmitting is performed by a browser program module incorporated within said application.

9. The method of claim 1, wherein said header information further identifies whether said device includes audio speakers.

10. The method of claim 1, wherein said header information further identifies an audio volume setting of said device.

11. The method of claim 10, further comprising excluding an audio portion of a requested web page based on said volume setting.

12. The method of claim 1, wherein said requested data is a web page, and wherein said received data is a version of said web page that omits one or more graphical buttons from said requested web page when said application is running in a partial screen mode.

13. A method of obtaining data for an application from a server using a browser program module for accessing information from the server by forming a request having a header, comprising the steps of:
   (a) said browser program module receiving, from the application, a request for data offered by the server;
   (b) transmitting, from the browser program module, a request for the data to the server, wherein the request includes header information identifying a current setting of a dynamic characteristic of the application requesting said data; and
   (c) receiving data from the server responsive to the request, wherein the received data is formatted in accordance with the header information,
   wherein said header information identifies a characteristic of an audio capability of said application.

14. The method of claim 13, wherein said characteristic of an audio capability identifies a volume setting.

15. The method of claim 14, wherein the received data is formatted to exclude an audio portion of said requested data based on said characteristic of an audio capability.

16. The method of claim 14, further comprising transmitting said requested data from said server in response to said request, and omitting an audio portion of said requested data from said transmission when said volume setting is at a predetermined level.

17. A computing device communicatively connected to a network, comprising:
   a processing unit; and
   one or more memories, wherein said one or more memories store a program module containing computer-executable instructions for performing the following steps:
      receiving, via said network, a request for a web page from a web browser,
   wherein said request includes header information identifying a current audio setting of a device on which said browser is running; and
      transmitting said requested web page responsive to said request, wherein said transmission omits an audio portion of said requested web page based on said current setting.

18. The computing device of claim 17, said one or more memories further comprising computer-executable instructions for performing the step of selecting a first version of said requested web page from a plurality of versions of said requested web page stored in said one or more memories for transmission responsive to said request, wherein said step of selecting is performed in accordance with said header information identifying a characteristic of said application.

19. The computing device of claim 18, wherein said header information identifies a size or resolution of a graphical display area used by said application.

20. The computing device of claim 17, further comprising computer-executable instructions for performing the steps of:
   retrieving said requested web page from said one or more memories; and
   modifying said requested web page in accordance with said header information identifying a characteristic of said application prior to said step of transmitting.

* * * * *